United States Patent
Rogers et al.

(10) Patent No.: US 9,118,614 B1
(45) Date of Patent: Aug. 25, 2015

(54) NOTIFICATION MANAGER

(71) Applicants: Lisa Herrup Rogers, Charlottesville, VA (US); Donald H. Hatch, Andover, MA (US)

(72) Inventors: Lisa Herrup Rogers, Charlottesville, VA (US); Donald H. Hatch, Andover, MA (US)

(73) Assignee: Intuit Inc., Mountain View, CA (US)

( * ) Notice: Subject to any disclaimer, the term of this patent is extended or adjusted under 35 U.S.C. 154(b) by 282 days.

(21) Appl. No.: 13/755,926

(22) Filed: Jan. 31, 2013

(51) Int. Cl.
*H04L 12/58* (2006.01)

(52) U.S. Cl.
CPC ..................... *H04L 51/24* (2013.01)

(58) Field of Classification Search
CPC ....................................................... H04L 51/24
USPC ................................................ 715/733, 742
See application file for complete search history.

(56) References Cited

U.S. PATENT DOCUMENTS

| | | | | |
|---|---|---|---|---|
| 6,057,834 A * | 5/2000 | Pickover | ......................... | 715/846 |
| 7,155,729 B1 * | 12/2006 | Andrew et al. | ................ | 719/318 |
| 7,937,670 B2 * | 5/2011 | Arthurs et al. | ................ | 715/804 |
| 8,595,322 B2 * | 11/2013 | Vasters | ......................... | 709/217 |
| 8,723,823 B2 * | 5/2014 | Shia et al. | ...................... | 345/173 |
| 2004/0061716 A1 * | 4/2004 | Cheung et al. | ................ | 345/710 |
| 2009/0044142 A1 * | 2/2009 | Faris et al. | ..................... | 715/780 |
| 2012/0102433 A1 * | 4/2012 | Falkenburg | ................... | 715/835 |
| 2014/0189592 A1 * | 7/2014 | Benchenaa et al. | ........... | 715/835 |
| 2014/0344721 A1 * | 11/2014 | Prakash | ......................... | 715/753 |

* cited by examiner

*Primary Examiner* — Omar Abdul-Ali
(74) *Attorney, Agent, or Firm* — Osha • Liang LLP

(57) ABSTRACT

A method to provide notifications to a user. The method includes using a software notification manager in the background to listens, according to user subscriptions, for notification messages sent through one or more messaging networks from multiple network applications. Accordingly, the notification manager gathers notifications and displays them in one place. As a result, the user is no longer required to sift through lots of notifications from his/her email folders or other message windows.

23 Claims, 5 Drawing Sheets

NOTIFICATION MANAGER

BACKGROUND

Small business owners who use network applications are constantly bombarded with email notifications regarding various status or events of the network applications. Some examples include "You've received an invoice/request for payment", "Someone has paid you", and "You need to update your account information." These notifications may also be sent via various messaging schemes with inconsistent user interfaces. When there are too many notifications, they become distractions from important business activities. Sometimes these notifications are overlooked or get stuck in spam filters. At these times, the notifications fail to serve their intended purpose, which is to notify the network application users about something that needs their attention.

SUMMARY

In general, in one aspect, the invention relates to a method to provide notifications to a user. The method includes receiving, by a computer processor, notification subscription information comprising user selections made by the user indicating a first request to receive the notifications from at least a first network application and a second network application, and a second request to access a website of a third network application upon detecting a notification from the third network application, obtaining, based on the notification subscription information, a first notification that is generated and sent by the first network application, wherein the first notification notifies the user regarding a first status of the first network application, obtaining, based on the notification subscription information, a second notification that is generated and sent by the second network application, wherein the second notification notifies the user regarding a second status of the second network application, obtaining, based on the notification subscription information, a third notification that is generated and sent by the third network application, wherein the third notification notifies the user regarding a third status of the third network application, aggregating, by the computer processor, at least the first notification and the second notification to generate a plurality of aggregate notifications, presenting, by the computer processor and to the user, the plurality of aggregate notifications as an aggregate notification list within a single user interface, and redirecting, in response to obtaining the third notification and based on the notification subscription information, the user to the website of the third network application.

In general, in one aspect, the invention relates to a system to provide notifications to a user. The system includes a first computer server configured to execute a first network application, a second computer server configured to execute a second network application, a third computer server configured to execute a third network application, a notification management application executing on a notification server and comprises an input module configured to receive notification subscription information comprising user selections made by the user indicating a first request to receive the notifications from at least the first network application and the second network application, and a second request to access a website of the third network application upon detecting a notification from the third network application, obtain, based on the notification subscription information, a first notification that is generated and sent by the first network application, wherein the first notification notifies the user regarding a first status of the first network application, obtain, based on the notification subscription information, a second notification that is generated and sent by the second network application, wherein the second notification notifies the user regarding a second status of the second network application, and obtain, based on the notification subscription information, a third notification that is generated and sent by the third network application, wherein the third notification notifies the user regarding a third status of the third network application, an aggregation module configured to aggregate at least the first notification and the second notification to generate a plurality of aggregate notifications, and an output module configured to present, to the user, the plurality of aggregate notifications as a list within a single user interface, and redirect, in response to obtaining the third notification and based on the notification subscription information, the user to the website of the third network application, and a repository configured to store the first notification, the second notification, the third notification, and the plurality of aggregate notifications, wherein the first computer server, the second computer server, and the notification server are coupled via a messaging network.

In general, in one aspect, the invention relates to a non-transitory computer readable medium storing instructions to provide notifications to a user, when executed by a computer processor, comprising functionality for receiving notification subscription information comprising user selections made by the user indicating a first request to receive the notifications from at least a first network application and a second network application, and a second request to access a website of a third network application upon detecting a notification from the third network application, obtaining, based on the notification subscription information, a first notification that is generated and sent by the first network application, wherein the first notification notifies the user regarding a first status of the first network application, obtaining, based on the notification subscription information, a second notification that is generated and sent by the second network application, wherein the second notification notifies the user regarding a second status of the second network application, obtaining, based on the notification subscription information, a third notification that is generated and sent by the third network application, wherein the third notification notifies the user regarding a third status of the third network application, aggregating at least the first notification and the second notification to generate a plurality of aggregate notifications, presenting, to the user, the plurality of aggregate notifications as an aggregate notification list within a single user interface, and redirecting, in response to obtaining the third notification and based on the notification subscription information, the user to the website of the third network application.

Other aspects of the invention will be apparent from the following detailed description and the appended claims.

DETAILED DESCRIPTION

Figure 1:
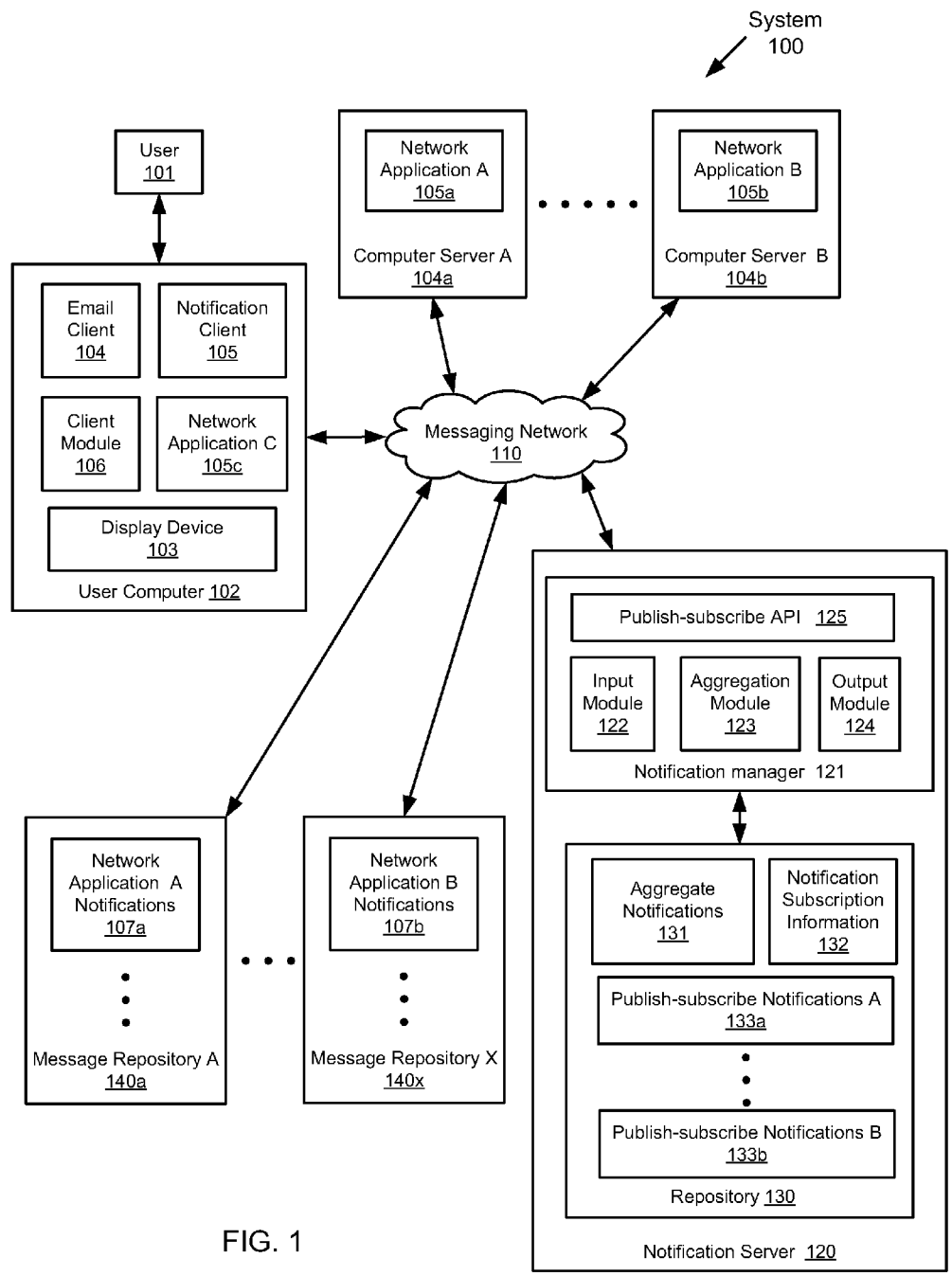
FIG. 1 shows a schematic diagram of a system of notification manager in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provides a method, system, and computer readable medium for managing notifications that are generated and sent from network applications. Throughout this disclosure, the term "network application" refers to a software application that is capable of sending notifications to the user via a messaging network (e.g., a network supporting email protocols, text messaging protocols, or any other software messaging protocol). In one or more embodiments, the network application may run on a mobile phone, tablet computer, desktop computer, gaming console, or any device equipped with computing and communication capabilities. In one or more embodiments, a software application (referred to as a notification manager) runs in the background and listens, according to user subscriptions, for notification messages sent through one or more messaging networks from multiple network applications. Accordingly, the notification manager gathers notifications and displays them in one place. As a result, the user is no longer required to sift through lots of notifications from his/her email folders or other message windows.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a user computer (102) of a user (101), computer servers (e.g., computer server A (104a), computer server B (104b), etc.), message repositories (e.g., message repository A (140a), message repository X (140x), etc.), and a notification server (120). In one or more embodiments, the user (101) is an individual who uses various network applications, such as the network application A (105a) executing on the computer server A (104a), the network application B (105b) executing on the computer server B (104b), and the network application C (105c) executing on the user computer (102). In one or more embodiments, the user computer (102) may be a mobile phone, tablet computer, desktop computer, gaming console, or any device equipped with computing and communication capabilities. From time to time, the network application A (105a), network application B (105b), and network application C (105c) send notifications (e.g., network application A notifications (107a), network application B notifications (107b), etc.) to the user (101) regarding various status and/or event of the network applications. For example, the network application A (105a), network application B (105b), and network application C (105c) may include an accounting application, a tax preparation application, a personal productivity application, etc.

The network application A notifications (107a), network application B notifications (107b), and other notifications (not shown) of the network application C (105c) may notify the user (101) that an invoice has been received by the accounting application, a tax filing deadline is approaching or a tax agency rule update has been received by the tax preparation application, a friend's birthday alert has been triggered in the personal productivity application, etc. Throughout this disclosure, the term "status" refers to a condition of the network application that triggers a notification to be sent by the network application. For example, the status may be related to an invoice that is generated by the merchant and sent to a customer for payment. The invoice was paid by the customer and the network application is notified of said payment. In another example, the status may be related to a customer who wants to pay an invoice via a different payment application and a notification is sent to inform the merchant that a customer is ready to pay now. In yet another example, the status relates to an application sending a notification to the merchant regarding a yearly invoice tax statement.

In one or more embodiments, the network application A notifications (107a) are generated and sent by the network application A (105a) as email messages that are stored on the message repository A (140a), which is part of an email server. In such embodiments, the user (101) may view the network application A notifications (107a) using the email client (104) installed on the user computer (102). For example, the user (101) may consider notifications of the network application A (105a) as critical to his business and view any single email notification immediately when it is available to view. In another example, the user (101) may be on vacation and only views the network application A notifications (107a) once a day as a batch.

In one or more embodiments, the network application A notifications (107a) are generated and sent by the network application A (105a) as text messages, such as Short Message Service (SMS), Multimedia Messaging Service (MMS), or other text based messages. For example, the message repository X (140x) may be part of a gateway for the text message transmission. In such embodiments, the user (101) may view the network application A notifications (107a) using a text message application (not shown) installed on the user computer (102).

In one or more embodiments, the network application B notifications (107b) are generated and sent by the network application B (105b) to a corresponding client module (106) installed on the user computer (102). In particular, the network application B (105b) and the client module (106) communicate with each other using a pre-determined software messaging protocol. For example, the software messaging protocol may be the Representation State Transfer (REST) protocol and the network application B notifications (107b) are stored in the message repository X (140x), which is part of a gateway for the REST message transmission. In such embodiments, the network application B notifications (107b) are presented to the user by the client module (106) using a user interface of the client module (106). For example, the client module (106) may display the network application B notifications (107b) in a pop-up window using the display device (103) of the user computer (102). In another example, the client module (106) may present the network application B notifications (107b) as voice messages using a speaker (not shown) of the user computer (102).

In one or more embodiments, the network application C (105c) may generate and present its notifications to the user (101) using a user interface of the network application C (105c). For example, the network application C (105c) may display its notifications as a local message in a local pop-up window using the display device (103). In another example, the network application C (105c) may present its notifications as voice messages using a speaker (not shown) of the user computer (102).

Further as shown in FIG. 1, the system (100) includes a notification server (120) executing a software application (referred to as the notification manager (121)) that includes an input module (122), aggregation module (123), output module (124), and a publish-subscribe API (application programming interface) (125). In one or more embodiments, the notification manager (121) is configured to consolidate notifications of the network application A (105a), network application B (105b), and network application C (105c) for delivery to the user (101). For example, these notifications may be consolidated into the aggregate notifications (131) based on notification subscription information (132) specified by the user (101). The notification server (120) also includes a repository (130) storing information related to the notification consolidation, such as the publish-subscribe notifications (e.g., publish-subscribe notifications A (133a), publish-subscribe notifications B (133b), etc.), aggregate notifications (131), and notification subscription information (132). For example, the publish-subscribe notifications A (133a), publish-subscribe notifications B (133b), aggregate notifications (131), and/or notification subscription information (132) may be stored in the repository (130) as a list, a file, a database, or other suitable data structures.

The message repository A (140a), message repository X (140x), and/or repository (130) may include a disk drive storage device, a semiconductor storage device, other suitable computer data storage device, or combinations thereof. In one or more embodiments, the message repository A (140a), message repository X (140x), and/or repository (130) may be located in a single device, or distributed across multiple devices. Various components of the system (100) are coupled via a messaging network (110). As noted above, the messaging network (110) supports one or more of email protocols, text messaging protocols, or any other software messaging protocol. In one or more embodiments, the messaging network (110) includes wired and/or wireless portions of public and/or private data network, such as wide area networks (WANs), local area networks (LANs), Internet, etc.

In one or more embodiments, the notification manager (121) includes the input module (122) and output module (124) that are configured to collectively present a single notification subscribing and receiving user interface to the user (101) for subscribing and receiving notifications from multiple network applications. In one or more embodiments, the input module (122) is configured to present a notification subscription menu (not shown) to the user (101). In one or more embodiments, the user (101) uses a browser installed on the user computer (102) to view the subscription menu as one or more webpages (not shown) hosted by the notification server (120).

In one or more embodiments, the notification subscription menu is presented to the user (101) by a notification client (105) of the notification manager (121). In particular, the notification client (105) is installed on the user computer (102) and is in communication with modules of the notification manager (121). In one or more embodiments, the subscription menu (not shown) allows the user (101) to select one or more of the network application A (105a), network application B (105b), network application C (105c), etc. for receiving notifications through the notification manager (121). These network applications selected by the user (101) to receive notification through the notification manager (121) are referred to as subscribed network applications. Whether the notification subscription menu (not shown) is webpage based or presented using the notification client (105), notifications of multiple network applications are subscribed by the user (101) all in one single user interface of the notification manager (121) (referred to as the notification subscribing user interface).

The notifications generated by multiple subscribed network applications are referred to as subscribed notifications. As will be further described in reference to the aggregation module (123), the subscribed notifications from multiple subscribed network applications are consolidated into the aggregate notifications (131). In one or more embodiments, the output module (124) is configured to present the aggregate notifications (131) to the user (101) using the aforementioned webpage or notification client (105). Whether the aggregate notifications (131) is webpage based or presented using the notification client (105), notifications of multiple network applications are presented to the user (101) all in this single user interface of the notification manager (121) (referred to as the notification receiving user interface).

In one or more embodiments, both the notification subscription menu (not shown) and the aggregate notifications (131) are webpage based. In other words, both the notification subscribing user interface and the notification receiving user interface are accessed and manipulated via a webpage. In one or more embodiments, both the notification subscription menu (not shown) and the aggregate notifications (131) are presented using the notification client (105). In other words, both the notification subscribing user interface and the notification receiving user interface are presented using the notification client (105). Whether webpage based or presented using the notification client (105), notifications of multiple network applications are all subscribed by and presented to the user (101) in one single user interface of the notification manager (121) (referred to as the notification subscribing and receiving user interface).

More particularly, the user (101) may select, via this single notification subscribing and receiving user interface (using text input, checkbox selection, voice input, or other suitable user input format supported by the user computer (102)) any network application for notification subscription. These user selections are then stored in the repository (130) as part of the notification subscription information (132). In response, the user (101) may receive, via this single notification subscribing and receiving user interface, the subscribed notifications in the form of the aggregate notifications (131) as a displayed list, narrated voice message, or other suitable output format supported by the user computer (102).

Figure 3A:
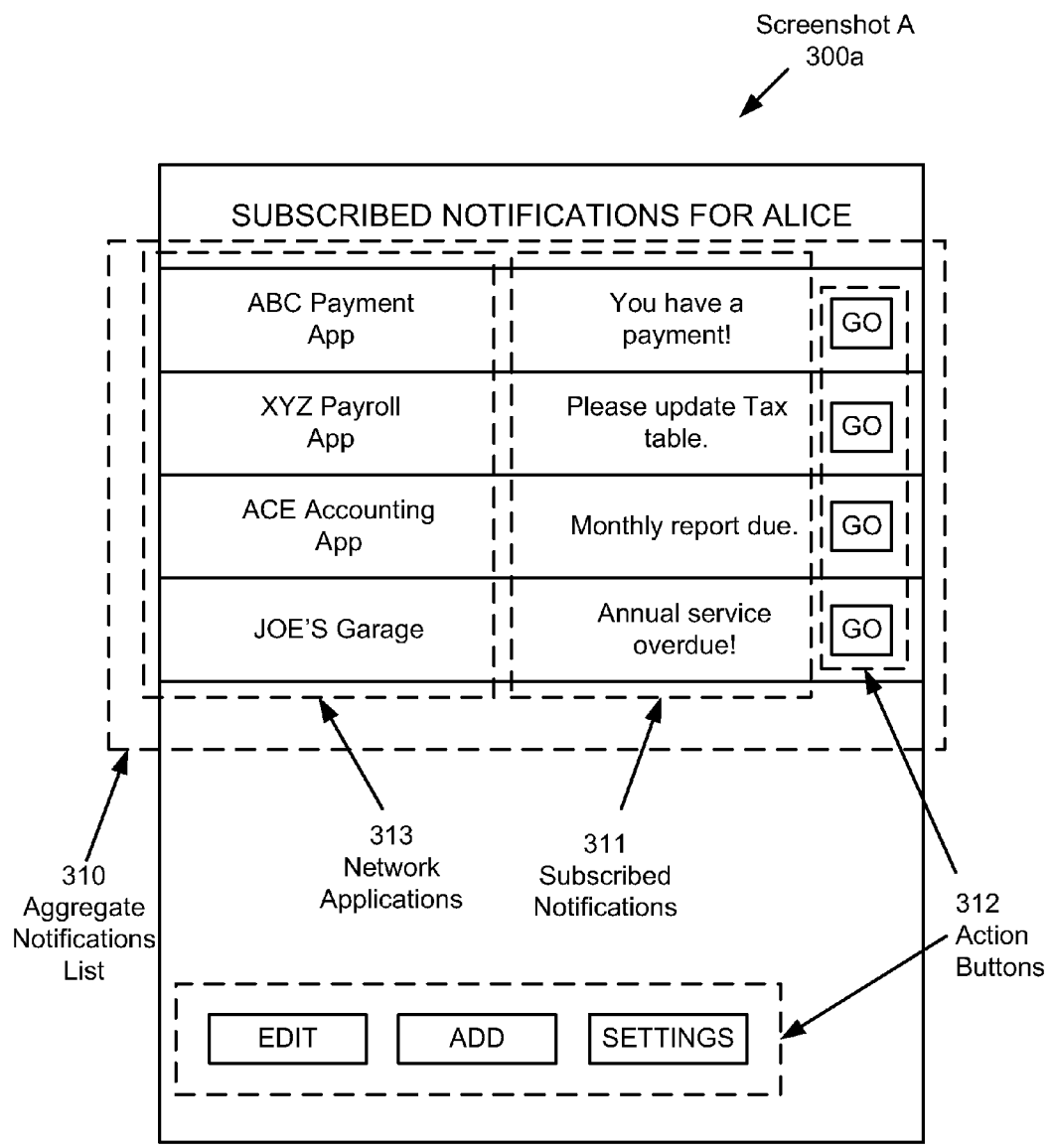
FIGS. 3A-3B show an example of notification manager in accordance with one or more embodiments of the invention.
Figure 3B:
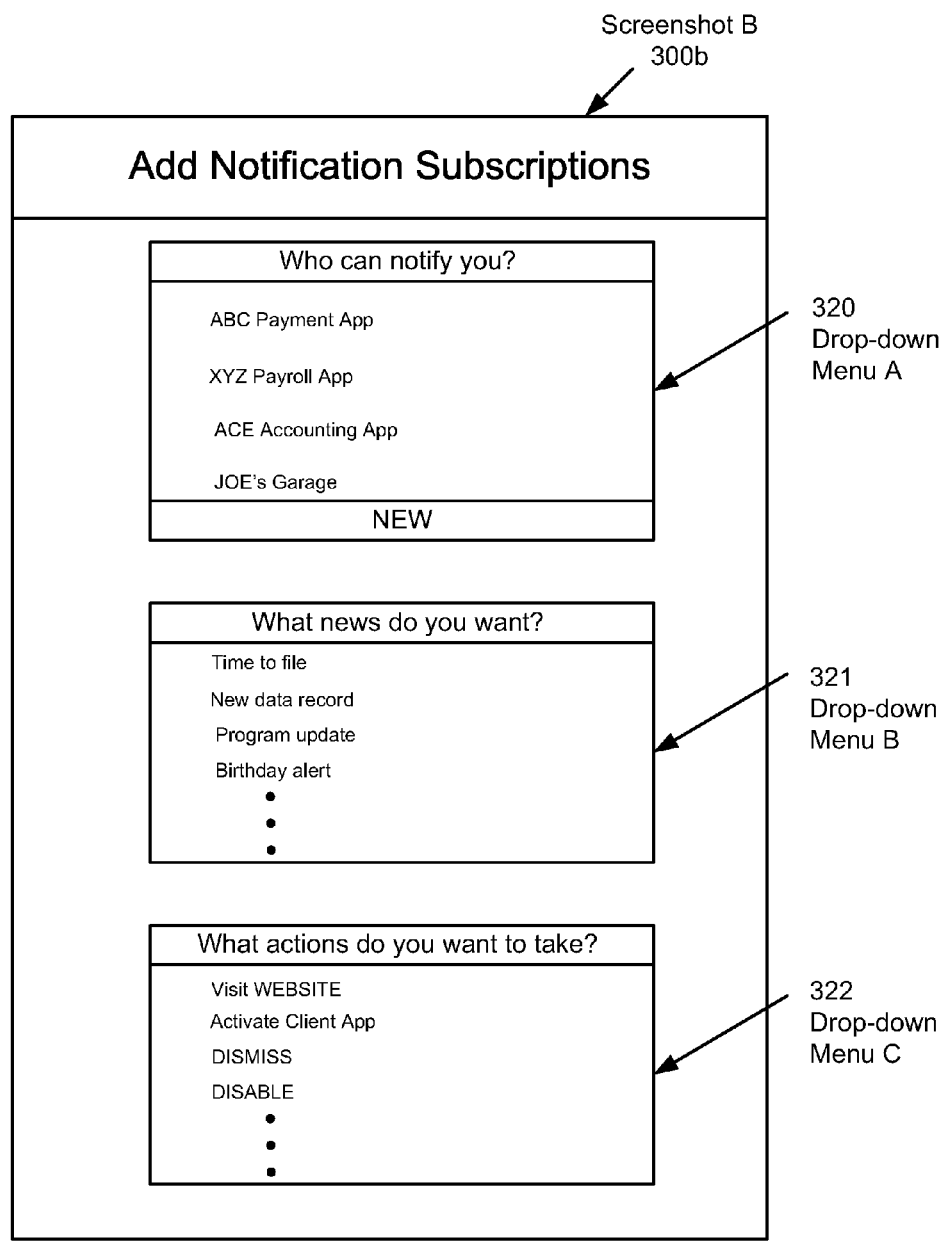

Throughout this disclosure, the term "single user interface" may refer to the single notification subscribing user interface, the single notification receiving user interface, or the single notification subscribing and receiving user interface interchangeably depending on the context. An example of this single notification subscribing and receiving user interface is shown in FIGS. 3A and 3B and described below.

In one or more embodiments, the notification subscription menu (not shown) further allows the user (101) to limit the subscribed notification from a subscribed network application to a particular type of notification. For a tax preparation software, the user may elect to receive only tax agency rule update notifications in the aggregate notifications (131) without including any other routine tax filing deadline reminder notifications. Such user specified criterion for each subscribed network application is also included in the notification subscription information (132).

In one or more embodiments, in addition to the option of including the notification in the aggregate notifications (131) (or not), the notification subscription menu further provides additional options allowing the user (101) to assign other action/task to a network application or to a particular type of notification from the network application. In response, the output module (124) is further configured to cause the assigned action/task to be performed with respect to the corresponding network application or the particular type of notification thereof. For example, these additional options may allow the user (101) to specify the action of accessing a website of a subscribed network application upon detecting any notification (or a specified type of notification) from this subscribed network application.

Accordingly, the output module (124) will redirect, or cause to redirect, the user (101) to the website of the subscribed network application when such notification is detected. For example, user credentials may be stored in the notification subscription information (132) to allow automatic login once redirected to the website. Other types of assigned action/task available to the user (101) for any network application, or a particular type of notification thereof, may include activating a client module of the network application, dismissing the notification, disabling the network application from sending any further notification, etc.

As noted above, the network application A (105a), network application B (105b), etc. may send a notification in an email, text message, or using other software message protocol, such as a Representational State Transfer (REST) protocol. In one or more embodiments, the input module (122) is further configured to intercept, based on the notification subscription information (132), an email message, text message, or REST message sent to the user (101) or the client module (106) from the network application A (105a), network application B (105b), etc. For example, originator/recipient information and/or user credential/authentication information associated with these network applications and their notifications may be stored in the notification subscription information (132). Accordingly, the notification subscription information may be used by the input module (122) to intercept these messages en route to the user computer (102) via the message repository A (140a) or message repository X (140x).

Once intercepted, the messages are analyzed by the input module (122) to extract the embedded notification and identify a type of the notification. Based on the aforementioned assigned action/task specified in the notification subscription information (132), the input module (122) may either pass the extracted notification to the aggregation module (123), discard the extracted notification, or initiate other actions in collaboration with the output module (124) (e.g., redirecting to the network application website, activating the network application client, disable any further notification from the network application, etc.).

In one or more embodiments, in lieu of the aforementioned email, text message, REST message, and/or local message, the network application A (105a), network application B (105b), and/or network application C (105c) may send the network application A notifications (107a), network application B notifications (107b), and/or notifications of the network application C (105c) based on the publish-subscribe framework. Publish—subscribe is a messaging framework where senders of messages, referred to as publishers, do not specify the messages to be sent to specific receivers, referred to as subscribers. Instead, publish—subscribe messages are published without knowledge of what, if any, subscribers there may be. Similarly, subscribers express interest in one or more class of publish—subscribe messages, and only receive messages that are of interest, without knowledge of what, if any, publishers there are.

In one or more embodiments, in addition to the aforementioned email, text message, REST message, and/or local message, the network application A (105a), network application B (105b), and/or network application C (105c), may send at least a portion of the network application A notifications (107a), network application B notifications (107b), and/or notifications of the network application C (105c) in a duplicate form based on the publish-subscribe framework.

In contrast to typical use of the publish-subscribe framework where the publisher has no knowledge of the subscribers, and vice versa, the publish-subscribe notifications (e.g., publish-subscribe notifications A (133a), publish-subscribe notifications B (133b), etc.) from the network application A (105a), network application B (105b), and/or network application C (105c) do specify the intended recipient (i.e., user (101)). Further, the notification manager (121) keeps track of the sender (publisher) of these publish-subscribe notifications so that the user (101) is not confused as to where each notification comes from. For example, the notification manager (121) tags the publish-subscribe notifications A (133a) as being published by the network application A (105a), publish-subscribe notifications B (133b) as being published by the network application B (105b), etc.

In one or more embodiments, these publish-subscribe notifications are sent using the publish-subscribe API (125) of the notification manager (121) based on the publish-subscribe framework. In one or more embodiments, the publish-subscribe API (125) specifies the repository (130) as the message repository where the network application A (105a), network application B (105b), and/or network application C (105c) publish their notifications into. For example, the network application A (105a) may publish its notifications into the repository (130) as publish-subscribe notifications A (133a), the network application B (105b) may publish its notifications into the repository (130) as publish-subscribe notifications B (133b), and so on and so forth. Accordingly, the input module (122) may retrieve subscribed notifications from these publish-subscribe notifications in the repository (130) according to the notification subscription information (132). For example, and email address or username information associated with the publisher and subscriber may be stored in the notification subscription information (132). Accordingly, they may be used by the input module (122) to properly retrieve and organize these messages from the repository (130).

Specifically, notifications from multiple network applications are published into and subscribed from a message repository (i.e., repository (130)) controlled by a single software application (i.e., the notification manager (121)). In contrast with typical use of the publish-subscribe framework, all notifications from multiple network applications published into this message repository can only be subscribed by a single software application (i.e., the notification manager (121)).

In one or more embodiments, the notification manager (121) includes the aggregation module (123) that is configured to aggregate the aforementioned subscribed notifications to generate a collection of aggregate notifications, referred to as the aggregate notifications (131). In one or more embodiments, the aggregate notifications (131) include a combination of subscribed notifications obtained by the input module (122) in different manners. The combination may include notifications published into the repository (130), as well as notifications intercepted from email transmission, text message transmission, REST message transmission, etc.

In one or more embodiments, the aggregate notifications (131) also includes attributes of the subscribed notifications, such as time stamps, network application IDs, notification recipient IDs, notification types, assigned actions/tasks, directly published or indirectly intercepted, etc. Accordingly, the aggregate notifications (131) may be presented to the user (101) in various different orders (e.g., based on time stamps, network application types, notification types, etc. or combinations thereof) as specified by the user (101) based on such attributes. For example, notifications from the network application A (105a) may be placed chronologically ahead of the notifications from the network application B (105b) within a same time period (e.g., within the same week, within the same day, within the same hour, etc.) based on user specified network application priority. In addition, each notification in the aggregate notifications (131) may be annotated with associated attributes to highlight certain aspects as specified by the user (101) based on such attributes. For example, tax filing or account payable overdue notifications may be highlighted in red while routine reminders may not be highlighted. Further, multiple collections of aggregate notifications (including the aggregate notifications (131)) may exist in the repository (130) when multiple users (including the user (101)) use the notification manager (121) simultaneously. Each of these multiple collections of aggregate notifications may be presented to the intended user among these multiple users based on the attributes of the subscribed notifications.

Figure 2:
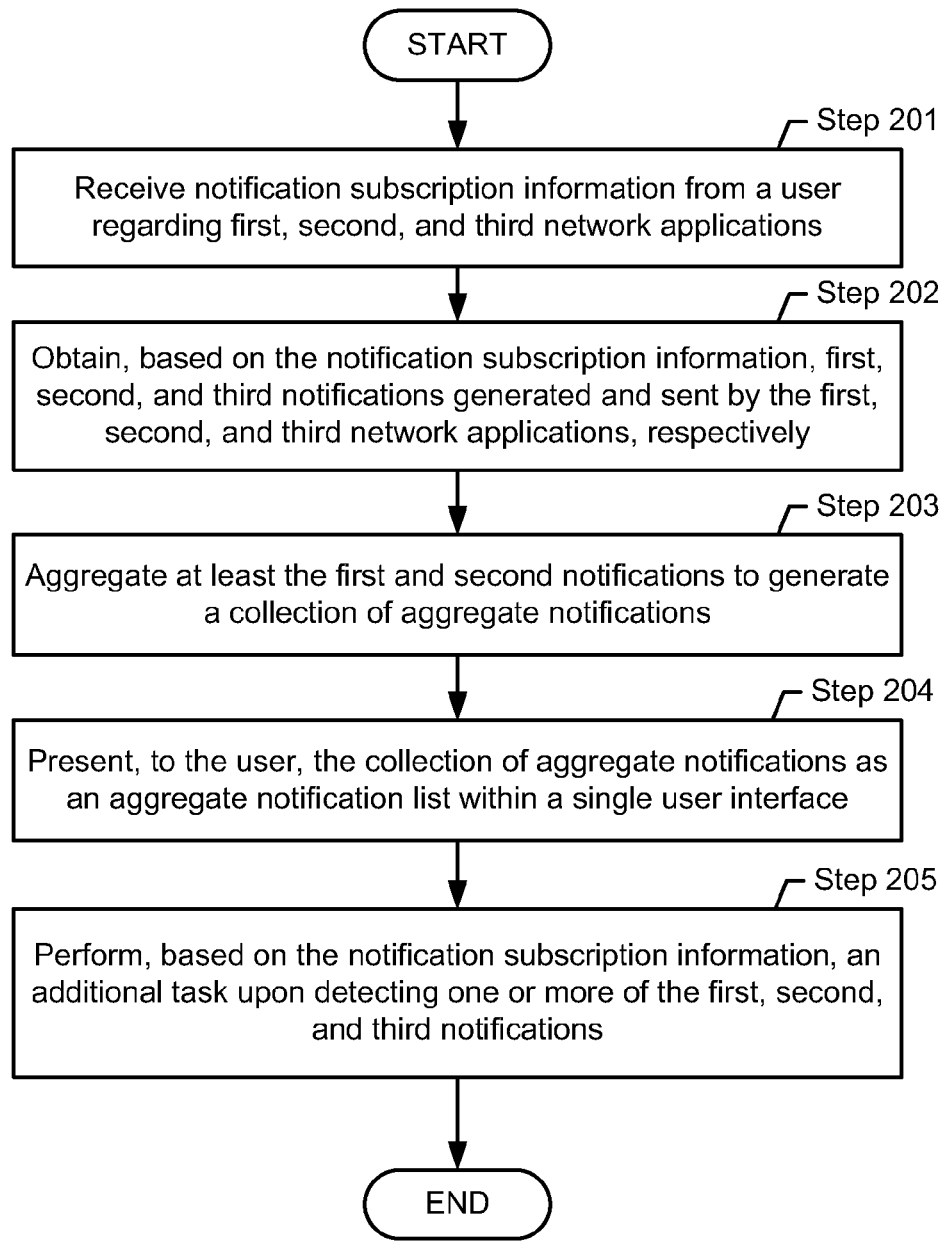
FIG. 2 shows a flowchart of a method of notification manager in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

In one or more embodiments, the method described in reference to FIG. 2 may be practiced using one or more components of the system (100). Specifically, the method described herein allows a user to subscribe notifications from multiple network applications that are delivered to the user as an aggregate notification list. For example, the network applications may include an accounting application used by a business entity associated with the user, a tax preparation application used by the business entity associated with the user, a personal productivity application used by the user him/herself, etc. The notifications from these example network applications may notify the user regarding a status related to a business financial transaction tracked by the accounting application (e.g., an invoice has been received), a status related to a tax filing or a tax agency update tracked by the tax preparation application (e.g., a tax filing deadline is approaching or a tax agency update has been received), a status related to a personal event tracked by the personal productivity management application (e.g., a friend's birthday alert), etc.

Initially in Step 201, notification subscription information is received from a user regarding a first network application, a second network application, and a third network application. In one or more embodiments, notification subscription information is received using a notification subscription menu presented to the user within a single user interface. For example, the notification subscription menu and the single user interface described in reference to FIG. 1 may be used.

Specifically, the notification subscription menu includes entries for each of the first, second, and third network applications. Selection entries for each network application allow the user to select one or more actions/tasks to be performed upon detecting any notification (or a particular type of notification) from the network application. The action/task may include whether (i) to include the notification in the aggregate notifications list; (ii) to exclude the notification from the aggregate notifications list; (iii) to direct the user to a website of the network application; (iv) to activate a client module of the network application to run on a device of the user; (v) to dismiss the notification; (vi) to disable any future notification from the network application, etc. For example, the user's selection may indicate a request to (a) add, from the first network application into the aggregate notifications list, only payment or filing overdue notifications; (b) add, from the second network application into the aggregate notifications list, all reminder notifications that are not monthly recurring; and (c) redirect the user to a website of the third network application upon detecting any notification from the third network application.

In Step 202, based on the notification subscription information, notifications generated and sent by the first, second, and third network applications are obtained. In particular, a first notification from the first network application notifies the user regarding a first status of the first network application, a second notification from the second network application notifies the user regarding a second status of the second network application, a third notification from the third network application notifies the user regarding a third status of the first network application.

In one or more embodiments, one or more of these network applications use the publish-subscribe framework to deliver notifications to the user. For example, the first notification may be extracted from a publish-subscribe message generated and published by the first network application. In one or more embodiments, the publish-subscribe API described in reference to FIG. 1 above is used to publish the publish-subscribe message containing the first notification. In particular, the publish-subscribe message is retrieved from a message repository specified by the publish-subscribe API.

In one or more embodiments, one or more of these network applications use the email or text message (e.g., SMS, MMS, etc.) network to deliver notifications to the user. For example, the second notification may be extracted from an email or text message sent by the second network application to the user.

In one or more embodiments, one or more of these network applications use a software messaging protocol (e.g., REST, etc.) to deliver notifications to the user via respective client module(s) of the corresponding network application(s). For example, the third notification may be extracted from a REST message sent by the third network application to a client module thereof executing on a computing device of the user.

In one or more embodiments, originator/recipient information, user credential/authentication information, and/or any other relevant information associated with these network applications and their notifications are stored in the notification subscription information for detecting and obtaining the notifications.

As noted above, in one or more embodiments, the user may have specified particular types of notification as a filter. Based on the example described in Step 201, the first notification and the second notification are analyzed to determine that the first status and the second status match the user specified criterion in the notification subscription information. For example, the first status is determined as an payment overdue notification and the second status is determined as an annual filing reminder. Since these status match the user specified criteria, the first notification and the second notification are considered as subscribed notifications and are to be included in the aggregate notification list.

In Step 203, the first notification and the second notification, among other subscribed notifications, are aggregated to generate a collection of aggregate notifications. In one or more embodiments, the notifications in the collection may be tagged with attributes of the subscribed notifications, such as time stamps, network application IDs, notification recipient IDs, notification types, assigned actions/tasks, directly published or indirectly intercepted, etc.

In Step 204, the collection of aggregate notifications are presented to the user as an aggregate notification list within a single user interface on the user's computing device. In one or more embodiments, the single user interface is web-based. In other words, the user uses a browser on his/her computing device to access webpage where the aggregate notification list is presented. For example, the webpage may be hosted by a notification management server operated by a third party notification management service to perform these method steps. In one or more embodiments, the single user interface is associated with an application installed on the user's computing device. For example, the local application may be a client module of a remote notification management application hosted by a third party notification management service to perform these method steps. In another example, the local application is the notification management application that performs these method steps. Accordingly, the aggregate notification list is presented to the user by this local application. In one or more embodiments, whether using a web-based user interface or a user interface of a local application, the aggregate notification list may be displayed in a window or delivered as a voice message. In one or more embodiments, the subscribed notifications in the aggregate notification list may be presented in an order based on the attributes of the subscribed notifications, such as time stamps, network application IDs, notification recipient IDs, notification types, assigned actions/tasks, directly published or indirectly intercepted, etc.

In Step 205, based on the notification subscription information, an additional task is performed upon detecting one or more of the first, second, and third notifications. In addition to including or excluding a notification in the aggregate notifications list, additional task may include directing the user to a website of the network application, activating a client module of the network application, dismissing the notification, disabling the network application from sending any further notification etc. Using the examples described in Step 201 and Step 202, the user specifies, in the notification subscription information, that the task to be performed upon detecting any notification from the third network application is to automatically re-direct the user to a website of the third network application. Accordingly, when the third notification is extracted from a REST message and checked against the notification subscription information to identify the assigned action/task, a browser is launched (if not running already) on the user's computing device to access a homepage of the third network application.

FIGS. 3A-3B show example user interfaces/screenshots of an application in accordance with one or more embodiments of the invention. The example user interfaces/screenshots as well as the application may be executed and/or displayed using the system (100) of FIG. 1 and based on the method described with respect to FIG. 2 above.

FIG. 3A shows an example screenshot A (300a) of the notification subscribing and receiving user interface described in reference to FIG. 1 above. For example, the screenshot A (300a) may be captured from a display on a user Alice's desktop computer. Alternatively, Alice can view the same display on her mobile phone when she is away from her desktop computer. The screenshot A (300a) may be displayed when Alice clicks an attention-getting icon on her mobile phone or desktop computer screen alerting her that a new notification is just received. This alert icon may vary to reflect different kinds of notifications, for example urgent notifications may be represented by a brighter-colored or blinking alert icon.

As shown in FIG. 3A, the screenshot A (300a) shows a title "SUBSCRIBED NOTIFICATIONS FOR ALICE" and includes the aggregate notification list (310), which contains subscribed notifications (311) recently received from multiple network applications that Alice has subscribed to receive notifications. The subscribed notifications (311) are labeled in the aggregate notification list (310) by the network applications (i.e., network applications (313)) that generated them. Each network application label in the network applications (313) has a text portion (typically the name of the network application) describing the network application and optionally a graphic portion (not shown, e.g., a logo or other icon representing various attributes of the network application) annotating the network application. The screenshot A (300a) also includes action buttons (312) that can be activated by Alice to add additional network application to her subscription list, edit the profiles of the currently subscribed network application, configure the notification settings, and expand each entry of the subscribed notifications (311) to read more information or use the network application by visiting a website of the network application or launching a local client application of the network application. For example, when Alice clicks on one of the action buttons (312) to add an additional subscription, her mobile phone or desktop computer switches to a different screen represented by the screenshot B (300b) shown in FIG. 3B.

As shown in FIG. 3B, the screenshot B (300b) shows a title "Add Notification Subscriptions" and includes three drop-down menus. Specifically, the drop-down menu A (320) shows currently subscribed network applications and allows Alice to type in the name or other identifier of a new network application to subscribe, the drop-down menu B (321) allows Alice to select a particular type of notification she wished to receive for the new subscription, the drop-down menu C (322) allows Alice to select additional actions/tasks to perform other than including notifications in or excluding notifications from the aggregate notifications list (310).

Figure 4:
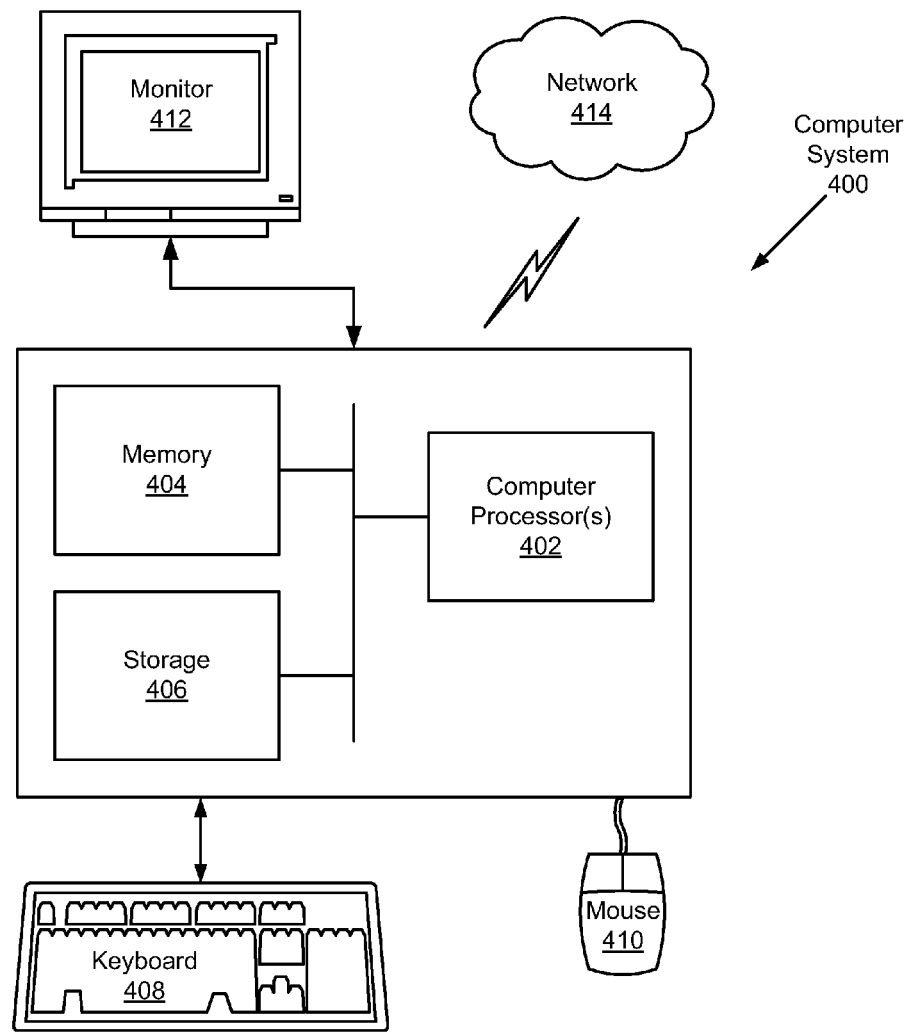
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more computer processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to provide notifications to a user, comprising:
receiving, by a computer processor, notification subscription information comprising user selections made by the user indicating a first request to receive the notifications from at least a first network application and a second network application, and a second request to access a website of a third network application upon detecting a notification from the third network application;
obtaining, based on the notification subscription information, a first notification that is generated and sent by the first network application, wherein the first notification notifies the user regarding a first status of the first network application;
obtaining, based on the notification subscription information, a second notification that is generated and sent by the second network application, wherein the second notification notifies the user regarding a second status of the second network application;
obtaining, based on the notification subscription information, a third notification that is generated and sent by the third network application, wherein the third notification notifies the user regarding a third status of the third network application;
aggregating, by the computer processor, at least the first notification and the second notification to generate a plurality of aggregate notifications;
presenting, by the computer processor and to the user, the plurality of aggregate notifications as an aggregate notification list within a single user interface;
determining that the third status matches a user specified criterion in the notification subscription information, wherein the user specified criterion specifies a type of notification from the third network application; and
redirecting, in response to obtaining the third notification and based on the notification subscription information, the user to the website of the third network application, wherein the user is redirected to the website of the third network application further in response to the determining.

2. The method of claim 1, further comprising:
presenting, to the user, a notification subscription menu within the single user interface,
wherein the first request and the second request are indicated by the user using the subscription menu within the single user interface.

3. The method of claim 1, further comprising:
determining that the first status and the second status match a user specified criterion in the notification subscription information, wherein the user specified criterion specifies a first type of notification from the first network application and a second type of notification from the second network application,
wherein the first notification and the second notification are aggregated in response to the determining.

4. The method of claim 1,
wherein the user selections made by the user further indicates a third request to perform a pre-determined task upon detecting a fourth notification from a fourth network application, and
wherein the pre-determined task comprises at least one selected from a group consisting of including the fourth notification in the plurality of aggregate notifications, directing the user to another website of the fourth network application, activating a client module of the fourth network application, dismissing the fourth notification, and disabling the fourth network application from sending any further notification.

5. The method of claim 1, further comprising:
retrieving a publish-subscribe message generated and published by the first network application, wherein the publish-subscribe message comprises the first notification,
wherein obtaining the first notification comprises extracting the first notification from the first publish-subscribe message.

6. The method of claim 5, further comprising:
intercepting at least one message selected from a group consisting of an email message sent from the second network application to the user and a software message sent from the second network application to a client module of the second network application, wherein the at least one message comprises the second notification,
wherein obtaining the second notification comprises extracting the second notification from the at least one message.

7. The method of claim 1,
wherein the first network application comprises an accounting application used by a business entity associated with the user, and
wherein the first status relates to recording a business financial transaction by the accounting application.

8. The method of claim 7,
wherein the second network application comprises an tax preparation application used by the business entity, and
wherein the second status relates to receiving an update from a tax agency by the tax preparation application.

9. The method of claim 7,
wherein the second network application comprises an personal productivity management application used by the user, and
wherein the second status relates to recording a personal event by the personal productivity management application.

10. A system to provide notifications to a user, comprising:
a first computer server configured to execute a first network application;
a second computer server configured to execute a second network application;
a third computer server configured to execute a third network application;

a notification management application executing on a notification server and comprises:
an input module configured to:
receive notification subscription information comprising user selections made by the user indicating a first request to receive the notifications from at least the first network application and the second network application, and a second request to access a website of the third network application upon detecting a notification from the third network application;
obtain, based on the notification subscription information, a first notification that is generated and sent by the first network application, wherein the first notification notifies the user regarding a first status of the first network application;
obtain, based on the notification subscription information, a second notification that is generated and sent by the second network application, wherein the second notification notifies the user regarding a second status of the second network application; and
obtain, based on the notification subscription information, a third notification that is generated and sent by the third network application, wherein the third notification notifies the user regarding a third status of the third network application;
an aggregation module configured to aggregate at least the first notification and the second notification to generate a plurality of aggregate notifications; and
an output module configured to:
present, to the user, the plurality of aggregate notifications as a list within a single user interface;
determine that the third status matches a user specified criterion in the notification subscription information, wherein the user specified criterion specifies a type of notification from the third network application; and
redirect, in response to obtaining the third notification and based on the notification subscription information, the user to the website of the third network application, wherein the user is redirected to the website of the third network application further in response to the determining; and
a repository configured to store the first notification, the second notification, the third notification, and the plurality of aggregate notifications,
wherein the first computer server, the second computer server, and the notification server are coupled via a messaging network.

11. The system of claim 10, the input module further configured to:
present, to the user, a notification subscription menu within the single user interface,
wherein the first request and the second request are indicated by the user using the subscription menu within the single user interface.

12. The system of claim 10, the input module further configured to:
determine that the first status and the second status match a user specified criterion in the notification subscription information, wherein the user specified criterion specifies a first type of notification from the first network application and a second type of notification from the second network application,
wherein the first notification and the second notification are aggregated in response to the determining.

13. The system of claim 10,
wherein the user selections made by the user further indicates a third request to perform a pre-determined task upon detecting a fourth notification from a fourth network application, and
wherein the pre-determined task comprises at least one selected from a group consisting of including the fourth notification in the plurality of aggregate notifications, directing the user to another website of the fourth network application, activating a client module of the fourth network application, dismissing the fourth notification, and disabling the fourth network application from sending any further notification.

14. The system of claim 10, the input module further configured to:
retrieve a publish-subscribe message generated and published by the first network application, wherein the publish-subscribe message comprises the first notification,
wherein obtaining the first notification comprises extracting the first notification from the first publish-subscribe message.

15. The system of claim 14, the input module further configured to:
intercept at least one message selected from a group consisting of an email message sent from the second network application to the user and a software message sent from the second network application to a client module of the second network application, wherein the at least one message comprises the second notification,
wherein obtaining the second notification comprises extracting the second notification from the at least one message.

16. The system of claim 10,
wherein the first network application comprises an accounting application used by a business entity associated with the user, and
wherein the first status relates to recording a business financial transaction by the accounting application.

17. The system of claim 16,
wherein the second network application comprises an tax preparation application used by the business entity, and
wherein the second status relates to receiving an update from a tax agency by the tax preparation application.

18. The system of claim 16,
wherein the second network application comprises an personal productivity management application used by the user, and
wherein the second status relates to recording a personal event by the personal productivity management application.

19. A non-transitory computer readable medium storing instructions to provide notifications to a user, when executed by a computer processor, comprising functionality for:
receiving notification subscription information comprising user selections made by the user indicating a first request to receive the notifications from at least a first network application and a second network application, and a second request to access a website of a third network application upon detecting a notification from the third network application;
obtaining, based on the notification subscription information, a first notification that is generated and sent by the first network application, wherein the first notification notifies the user regarding a first status of the first network application;
obtaining, based on the notification subscription information, a second notification that is generated and sent by the second network application, wherein the second notification notifies the user regarding a second status of the second network application;

obtaining, based on the notification subscription information, a third notification that is generated and sent by the third network application, wherein the third notification notifies the user regarding a third status of the third network application;

aggregating at least the first notification and the second notification to generate a plurality of aggregate notifications;

presenting, to the user, the plurality of aggregate notifications as an aggregate notification list within a single user interface;

determining that the third status matches a user specified criterion in the notification subscription information, wherein the user specified criterion specifies a type of notification from the third network application; and redirecting, in response to obtaining the third notification and based on the notification subscription information, the user to the website of the third network application, wherein the user is redirected to the website of the third network application further in response to the determining.

20. The non-transitory computer readable medium of claim 19, wherein the user selections made by the user further indicates a third request to perform a pre-determined task upon detecting a fourth notification from a fourth network application, and wherein the pre-determined task comprises at least one selected from a group consisting of including the fourth notification in the plurality of aggregate notifications, directing the user to another website of the fourth network application, activating a client module of the fourth network application, dismissing the fourth notification, and disabling the fourth network application from sending any further notification.

21. The non-transitory computer readable medium of claim 19, wherein the first network application comprises an accounting application used by a business entity associated with the user, and wherein the first status relates to recording a business financial transaction by the accounting application.

22. The non-transitory computer readable medium of claim 21, wherein the second network application comprises an tax preparation application used by the business entity, and wherein the second status relates to receiving an update from a tax agency by the tax preparation application.

23. The non-transitory computer readable medium of claim 21, wherein the second network application comprises an personal productivity management application used by the user, and wherein the second status relates to recording a personal event by the personal productivity management application.

* * * * *